(12) United States Patent
Cselle et al.

(10) Patent No.: US 9,866,586 B2
(45) Date of Patent: Jan. 9, 2018

(54) FACILITATING CROSS-PLATFORM CONTENT ACCESS

(71) Applicant: Twitter, Inc., San Francisco, CA (US)

(72) Inventors: Gabor Cselle, San Francisco, CA (US); Tural Badirkhanli, San Francisco, CA (US); Kelton Lynn, San Francisco, CA (US); Michael Ducker, San Francisco, CA (US); Jeffrey Seibert, Jr., San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 412 days.

(21) Appl. No.: 14/699,926

(22) Filed: Apr. 29, 2015

(65) Prior Publication Data

US 2015/0317343 A1    Nov. 5, 2015

Related U.S. Application Data

(60) Provisional application No. 61/986,815, filed on Apr. 30, 2014.

(51) Int. Cl.
*G06F 17/30* (2006.01)
*H04L 29/06* (2006.01)
*H04L 12/58* (2006.01)
*G06Q 10/06* (2012.01)

(52) U.S. Cl.
CPC ........ *H04L 63/145* (2013.01); *G06F 17/3053* (2013.01); *G06F 17/30321* (2013.01); *G06F 17/30887* (2013.01); *G06F 17/30958* (2013.01); *G06Q 10/06* (2013.01); *H04L 51/12* (2013.01)

(58) Field of Classification Search
CPC ........... G06F 17/30321; G06F 17/3053; G06F 17/30887; G06F 17/30958; H04L 63/145; H04L 51/12; G06Q 10/06
USPC ........................................................ 707/741
See application file for complete search history.

(56) References Cited

U.S. PATENT DOCUMENTS

| | | | | |
|---|---|---|---|---|
| 6,837,789 B2 * | 1/2005 | Garahi | ................... | G06Q 50/34 |
| | | | | 463/29 |
| 7,373,422 B1 * | 5/2008 | Paul | ..................... | H04L 67/303 |
| | | | | 709/227 |
| 7,465,231 B2 * | 12/2008 | Lewin | .................... | A63F 13/12 |
| | | | | 463/29 |

(Continued)

OTHER PUBLICATIONS

Jetter, Hans-Christian, et al., "ZOIL—A Cross-Platform User Interface Paradigm for Personal Information Management", CHI 2008, Florence, Italy, Apr. 5-10, 2008, 9 pages.*

(Continued)

*Primary Examiner* — Robert Stevens
(74) *Attorney, Agent, or Firm* — Fenwick & West LLP (57) ABSTRACT

A messaging system includes features of gathering information regarding content accessed across multiple applications and/or devices and making that information available to account holders of the messaging system. The messaging system stores data related to accessed content in a plurality of indices and makes that data available to enable account holders to access previously-accessed content, even if the previous access occurred in a different software application, on a different device, or on a device with a different operating system. Account holders may also be provided with recommendations based on gathered information.

30 Claims, 7 Drawing Sheets

(56) References Cited

U.S. PATENT DOCUMENTS

| | | | |
|---|---|---|---|
| 7,907,966 B1* | 3/2011 | Mammen | G06F 9/4443 |
| | | | 455/557 |
| 8,838,589 B1 | 9/2014 | Tam | |
| 2004/0261107 A1 | 12/2004 | Lee et al. | |
| 2006/0047844 A1* | 3/2006 | Deng | G06F 17/3089 |
| | | | 709/231 |
| 2007/0061332 A1 | 3/2007 | Ramer et al. | |
| 2008/0077574 A1 | 3/2008 | Gross | |
| 2009/0049074 A1* | 2/2009 | Dara-Abrams | G06F 17/30017 |
| 2013/0254314 A1* | 9/2013 | Chow | H04L 67/06 |
| | | | 709/206 |
| 2013/0332838 A1* | 12/2013 | Naggar | G06Q 30/06 |
| | | | 715/733 |
| 2014/0012619 A1* | 1/2014 | Natarajan | H04L 51/32 |
| | | | 705/7.19 |
| 2014/0067597 A1 | 3/2014 | Kirkby et al. | |
| 2014/0081965 A1 | 3/2014 | Gross | |
| 2014/0181935 A1* | 6/2014 | Beckmann | H04L 63/10 |
| | | | 726/7 |
| 2014/0317038 A1 | 10/2014 | Mojsilovic et al. | |
| 2014/0365432 A1* | 12/2014 | Jain | G06F 17/30194 |
| | | | 707/610 |
| 2015/0012616 A1* | 1/2015 | Pearl | H04L 67/1095 |
| | | | 709/219 |
| 2015/0012861 A1* | 1/2015 | Loginov | G06F 9/543 |
| | | | 715/770 |
| 2016/0283567 A1* | 9/2016 | Beausoleil | G06F 3/04842 |

OTHER PUBLICATIONS

Taleb, M., et al., "Pattern-Oriented Design Composition and Mapping for Cross-Platform Web Applications", DSVIS 2006, Trinity College, Dublin, Ireland, The XIII International Workshop, Jul. 26-28, 2006, 14 pages.*

Heitkotter, Henning, et al., "Cross-Platform Model-Driven Development of Mobile Applications with MD2", SAC '13, Coimbra, Portugal, Mar. 18-22, 2013, pp. 526-533.*

* cited by examiner

Example Account Index 400

| Account ID | Application ID | Content Item ID |
|---|---|---|
| @camera&carl | app.news.com | 78704 |
| @camera&carl | app.news.com | 7984566gfd |
| @camera&carl | app.sports.com | Kjaluih.874.fs |
| @camera&carl | app.stocks.com | 684684:ui/TDR45 |
| @camera&carl | app.games.com | 59855asdf4 |

Keys 410 — Values 420

FACILITATING CROSS-PLATFORM CONTENT ACCESS

CROSS REFERENCE TO RELATED APPLICATION

This application claims the benefit of U.S. Provisional Application No. 61/986,815, filed Apr. 30, 2014, which is incorporated by reference in its entirety.

BACKGROUND

The disclosure generally relates to mobile device software, and particularly to facilitating access to content on a mobile device.

There is a wide range of software applications that allow mobile device users to access content. These applications typically provide a user with some combination of text, images, and software constructs. Often these applications include a history log of what content a user has accessed within the application.

However, a mobile device user may access content within dozens of different software applications. Further, the user may use multiple devices to access content. If the user does not remember the application or device on which a particular content item was accessed, it may be difficult to find the content item even if it is stored in a history log of one of the dozens of applications. Manually searching through each software application on a particular device or a set of devices takes time and effort. Further, users use different devices at different times, and may desire to access a content item on a different device running a different operating system from the device originally used to access the content. Finding a previously accessed content item is not a trivial task, and may discourage users from using applications to access content because the time and effort required to access a previously accessed content item may make other options for accessing content more attractive.

The Figures (FIGS.) and the following description relate to example embodiments by way of illustration only. It should be noted that from the following discussion, alternative embodiments of the structures and methods disclosed herein will be readily recognized as viable alternatives that may be employed without departing from the principles of what is claimed.

DETAILED DESCRIPTION

I. Configuration & Operation Overview

A messaging system includes features of gathering information regarding content accessed across multiple applications and devices and making that information available to account holders of the messaging system. In one embodiment, software code representing a common application component is added to a software application, for example, by a developer of the software application including software code provided as part of a software development kit (SDK) available for use in the application code. The common application component sends a data entry to the messaging system when a content item is accessed. The data entry sent by the common application component may relate to the content item itself, the application used to access the content item, or the device running the application. An index module of a messaging server receives the data entry and stores various elements in one or more indices in an index repository.

Indices in the index repository may include an account index, which contains entries that associate the content items accessed by each account holder of the messaging system. An example account index entry comprises an account identifier, an application identifier, and a content item identifier. The account index data associated with an account holder may be provided to the account holder in the form of a list of content items.

Indices in the index repository may further include a correlation index, which contains entries that associate content items with content item addresses corresponding to various operating systems. An example correlation index entry comprises a content item identifier, an application identifier, an operating system identifier, and a content item address. A correlation index entry may further include the actual media contents of of a content item (e.g., text) to enable text or other content-based searching. A content identifier and an application identifier correspond to a particular content item and application respectively, but do not vary across different operating systems. A content item address corresponds to an instance of a content item within an application running on a particular operating system. Correlation index data for a particular content item may be received responsive to content item access by multiple account holders.

The content item access events stored in the account index, and correlation entries stored in the correlation index facilitate ease of access across computing platforms having different operating systems. For example, if an account holder accesses a content item using an application on an APPLE IPAD™ running the IOS™ operating system, these indices together allow the account holder to conveniently and directly access the content item using the same application on their smartphone running the ANDROID™ operating system, even if the account holder had never before accessed the content using their smartphone. In this example, the account index provides a content item access log of all content items accessed by the account holder regardless of device or operating system used, and the correlation index allows for immediate retrieval and navigation to that content within the associated application on any of the account holder's devices without requiring the account holder to navigate in a traditional manner through the application to that particular content item. This ease-of-use from the account holder's perspective is provided by the cross platform/operating system compatibility provided by the account and correlation indices. These indices are populated by content item access events reported by applications including code from the SDK mentioned above. As the SDK code can be incorporated into any application regardless of operating system, this solution is easily extendable to existing applications as well as any future applications. This is particularly useful for mobile software applications, that have more restrictive operating systems for this kind of reporting than, for example, traditional desktop computers, and may also be useful for other types of computing platforms and operating systems.

Recommendations for additional content items or applications related to content items may be provided in association with the list of content items. The index module may receive a request to access a content item (e.g. responsive to the account holder interacting with the list). The index module retrieves and sends a content item address corresponding to the content item and the operating system of the requesting device. Using the content item address, an account holder may directly access the content item within the corresponding application and operating system combination.

II. Computing Environment

Figure 1:
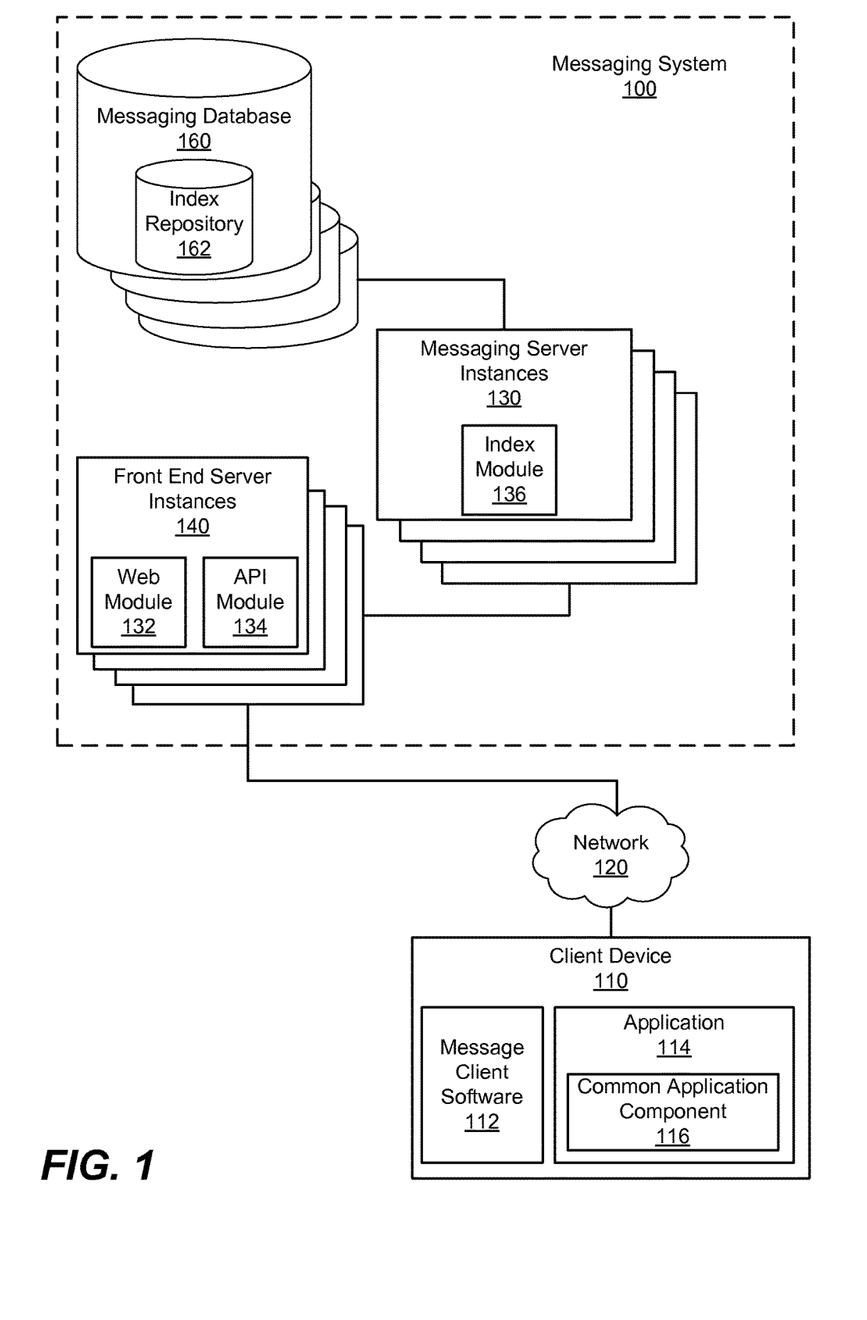
FIG. 1 illustrates the computing environment for facilitating content item access within client computing devices, according to one embodiment.

FIG. 1 illustrates the computing environment for facilitating content item access within client computing devices, according to one embodiment. The environment includes a client device 110, a network 120, a front end server 140, a number of messaging server instances 130, and a database 160.

Account holders use client devices 110 to access the messaging system 100 to publish messages, view and curate their streams, and view and interact with lists of content items. A client device 110 is a computer including a processor, a memory, and generally any one or more of a display, an input device, and a wired and/or wireless network device for communicating with the front end server 140 of the messaging system 100 over network 120. For example, a client device 110 may be a desktop computer, a laptop computer, a tablet computer, a smart phone, or any other device including computing functionality and data communication capabilities.

The processor of the client device 110 operates computer software 112 configured to access the front end server 140 of the messaging system 100 so that the account holder can publish messages, view and curate their streams, and view and interact with lists of content items. The software 112 may be a web browser, such as GOOGLE CHROME™, MOZILLA FIREFOX™, or MICROSOFT INTERNET EXPLORER™. The software 112 may also be a dedicated piece of software designed to work specifically with the messaging system 100. Generally, software 112 may also be a Short Messaging Service (SMS) interface, an instant messaging interface, an email-based interface, an API function-based interface, etc. In various embodiments, the processor of client device 110 operates an operating system.

The processor of client device 110 may operate software application 114. A client device 110 may operate multiple applications 114. In some embodiments, client device 110 may be configured to operate multiple applications 114 simultaneously. Examples of applications 114 include web browsers (e.g. GOOGLE CHROME™, MOZILLA FIREFOX™, MICROSOFT INTERNET EXPLORER™, etc.), messaging services (FACEBOOK™, TWITTER™, etc.), and other mobile applications (GOOGLE MAPS™, FLIPBOARD™, NYTIMES™, AMAZON™, etc.). Applications 114 may execute in conjunction with an operating system of a client device 110. Example operating systems include APPLE IOS™, GOOGLE ANDROID™, MICROSOFT WINDOWS PHONE™, MICROSOFT WINDOWS 8™, APPLE OSX™, etc.

Each application 114 has an associated application identifier (ID). The application ID is independent of the operating system within which the application 114 is executing, which means that different instances of an application executing on different client devices 110 having different operating systems still have the same application ID. The application ID may be required to be a domain (e.g. a verified web address) to deter impersonation by unknown parties.

The network 120 may comprise any combination of local area and/or wide area networks, the internet, or one or more intranets, using both wired and wireless communication systems.

The messaging system 100 generally provides account holders with the ability to publish their own messages and view messages authored by other accounts. Messages may take of variety of forms including, digital text, videos, photos, web links, status updates, blog entries, tweets, profiles, and the like. The messaging system 100 may also provide various complementary services such as those provided by social networks, blogs, news media, forums, user groups, etc. An example of a messaging system 100 is TWITTER™. The messaging system 100 is a distributed network including multiple computing devices, where each computing device in the system includes computer hardware specifically chosen to assist in the carrying out of its specific purpose.

Client 110 interfaces with the messaging system 100 through a number of different but functionally equivalent front end servers 140. The front end server 140 is a computer server dedicated to managing network connections with remote clients 110. As the messaging system 100 may have many millions of accounts, there may be anywhere from hundreds of thousands to millions of connections being established or currently in use between clients 110 and the front end server 140 at any given moment in time. Including multiple front end servers 140 helps balance this load across multiple countries and continents.

The frontend module 140 may provide a variety of interfaces for interacting with a number of different types of clients 110. For example, when an account holder uses a web browser 112 to access the messaging system 100, a web interface module 132 in the front end module 140 can be used to provide the client 110 access. Similarly, when an account holder uses an item of software 112 that calls an API 134 made available by the messaging system 100 for such a purpose, an API interface module 134 can be used to provide the client 110 access.

The front end server 140 is further configured to communicate with the other backend computing devices of the messaging system 100. These backend computing devices carry out the bulk of the computational processing performed by the messaging system 100 as a whole. The backend computing devices carry out any functions requested by a client 110 and return the appropriate response/s to the front end servers 140 for response to the client 110.

The backend computing devices of the messaging system 100 include a number of different but functionally equivalent messaging servers 130 which are each associated with at least one messaging database 160. The components and behavior of the messaging servers 130 including the illustrated index modules 136, and databases 160 and the illustrated index repositories 162, are described immediately below with respect to FIG. 2.

III. Messaging Server

Figure 2:
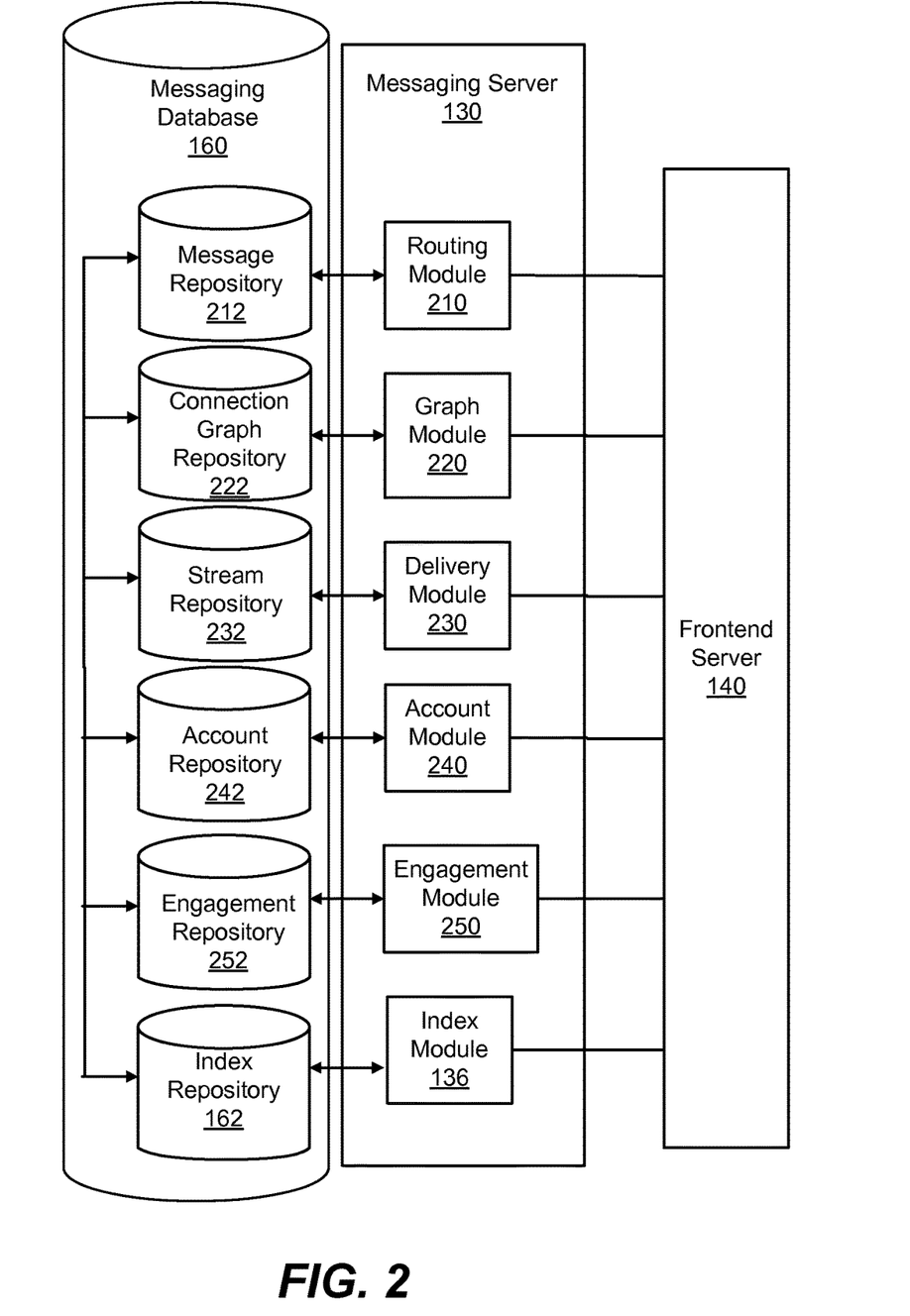
FIG. 2 illustrates the logical components of a messaging server, according to one embodiment.

FIG. 2 illustrates the logical components of a messaging server 130, according to one embodiment. Each messaging server 130 handles at least the basic messaging functionality of the messaging system 100. This basic functionality includes at least publishing new messages, providing message streams to be provided upon client request, managing accounts, managing connections between accounts, messages, and streams, and receiving engagement data from clients engaging with messages. Each messaging server also handles indexing of content item access data and providing of indexed data to account holders, as discussed below with respect to FIGS. 3-7.

Each messaging server 130 includes a routing module 210, a graph fanout module 220, a delivery module 230, an account module 240, an engagement module 250, and an index module 136. Each messaging server 130 is communicatively coupled with an associated database 160 which stores data locally for convenient access by the associated messaging server 130. Each database 160 includes a message repository 212, a connection graph repository 222, a stream repository 232, an account repository 242, an engagement repository 252, and an index repository 162.

In the messaging system 100, messages are containers for a variety of types of computer data representing content provided by the composer of the message. Types of data that may be stored in a message include text (e.g., 140 character Tweet), graphics, video, computer code (e.g., uniform resource locators (URLs)), or other content. Messages can also include key phrases (e.g., symbols, such as hashtag "#") that can aid in categorizing or contextualizing messages. Messages may also include additional metadata that may or may not be editable by the composing account holder, depending upon the implementation. Examples of message metadata include the time and date of authorship as well as the geographical location where the message was composed (e.g., the current physical location of the client 110). Message are not only a representation of the written text, video, or audio media, but also a representation of that content captured within an electronic representation, and stored as data within a computing device.

The messages composed by one account holder may also reference other accounts. For example, a message may be composed in reply to another message composed by another account. Messages may also be repeats (or reposts) of a message composed by another account. Generally, an account referenced in a message may both appear as visible content in the message (e.g., the name of the account), and may also appear as metadata in the message. As a result, the messaging system 100 is able to allow the referenced accounts to be interactive. For example, clients 110 may interact with account names that appear in their message stream to navigate to the message streams of those accounts. The messaging system 100 also allows messages to be private, such that a composed message will only appear in the message streams of the composing and recipient accounts.

The routing module 210 stores newly composed messages received through the frontend module 110 in the message repository 212. In addition to storing the content of a message, the routing module 210 also stores an identifier for each message. The identifier provides a piece of information that can be used to identify that the message is to be included in a message stream. This allows the message to be stored only once, and accessed for a variety of different message streams without needing to store more than one copy of the message.

The graph module 220 manages connections between accounts, thereby determining which streams include messages from which accounts. In one embodiment, the messaging system 100 uses unidirectional connections between accounts (or streams) to allow account holders to subscribe to the message streams of other accounts. By using unidirectional connections, the messaging system 100 allows an account holder to receive messages that appear in one of the streams of one of the other account holders, without necessarily implying any sort of reciprocal relationship the other way. For example, the messaging system 100 allows account holder A to subscribe to the message stream of account holder B, and consequently account holder A is provided and can view the messages authored by account holder B. However, this unidirectional connection of A subscribing to B does not imply that account holder B can view the messages authored by account holder A. This could be the case if account holder B subscribed to the message stream of account holder A; however, this would require the establishment of another unidirectional connection. In one embodiment, an account holder who establishes a unidirectional connection to receive another account's message stream is referred to as a "follower", and the act of creating the unidirectional connection is referred to as "following" another account. The graph module 220 receives requests to create and delete unidirectional connections between accounts through the frontend module 140. These connections are stored for later use in the connection graph repository 222 as part of a unidirectional connection graph. Each connection in the connection graph repository 222 references an account in the account repository 242 or a stream in the stream repository 232.

In the same or a different embodiment, the graph module 220 manages connections between accounts using bidirectional connections. Upon establishing a bidirectional connection, both accounts are considered subscribed to each other's account message stream(s). The graph module stores bidirectional connections in the connection graph repository 222. In one embodiment, the messaging system 100 and connection graph repository 222 include both unidirectional and bidirectional connections. Additionally, the connections (both unidirectional and bidirectional) are electronic representations of relationships between physical entities.

The delivery module 230 constructs message streams and provides them to requesting clients 110 through the frontend module 140. Responsive to a request for a stream, the delivery module 230 either constructs the stream in real time, or accesses some or all of a stream that has already been generated from the stream repository 232. The delivery module 230 stores generated streams in the stream repository 232. An account holder may request any of their own streams, or the streams of any other account that they are permitted to access based on security settings.

The messages included in a stream may have been authored by a connected account while both accounts are simultaneously accessing the messaging system 100. The messages included in a stream also include messages authored in the past by accounts that are not currently accessing the messaging system 100. As introduced above, the contents of a message stream for a requesting account holder may include messages composed by that account holder, messages composed by the other accounts that the requested account holder follows, and messages authored by other accounts that reference the requested account holder. The messages of a stream may be ordered chronologically by time and date of authorship, or reverse chronologically. Other orderings may also be used, such as according to their inferred relevance to the account holder, or some combination of time and relevance rankings A stream has the potential to include a large number of messages. For both processing efficiency and the requesting account holder's viewing convenience, the delivery module 230 generally identifies a subset of possible messages for sending to the client 110 once the stream is generated. The remainder of the messages in the stream are maintained in the stream repository 232, and sent upon client 110 request.

The account module 240 provides functionality allowing an account holder to manage their account with the messaging system 100, and is one means for doing so. The account module 240 allows the account holder to manage privacy and security settings, as well as directly manage their connections to other account holders. Generally, the messaging system 100 does not require the account holder to contribute a large amount of personal information. This personal information can include an account name (not necessarily a real name) or identifier (ID), provides pictures of media, provide a brief description of themselves/their entity, and a website. The personal information does not necessarily include (and may purposefully exclude) traditional real-world identifying information such as age, gender, interests, history, occupation, etc. In one embodiment, account module 240 assigns an account identifier (ID) to each account. Provided information is stored in the account repository 242.

The message client software 112 allows account holders receiving a stream to engage (e.g., interact) with the messages in the stream. Engagement module 250 receives these engagements and stores them in the engagement repository 252. There are a number of different types and categories of engagements. Types of engagement include clicking/selecting a message for more information regarding the message, clicking/selecting a URL (universal resource locator) or hashtag in a message, reposting the message, or favoriting a message. Other example engagements types include expanding a "card" (or compressed) message, which presents additional (uncompressed) content when an account holder engages with the card message. Account holders may engage further with content contained in the expanded card message (e.g., by playing a video or audio file or by voting in a poll). Some engagements are based on passive behavior by the account holder with respect to a stream or message appearing on the client device 110.

In addition to monitoring active interactions (e.g., engagements) with messages through explicitly received input at the client device 110 from the account holder, the engagement module 250 may also record passive interactions (e.g., impressions) with messages by accounts. An impression occurs when an account holder views or otherwise experiences the content of a message through a client 110. Impression engagements include the mere fact that an impression occurred, as well as other information such as whether a message in a stream appeared on a display of the client device 110, and how long the account holder dwelled on a message appearing on the display.

Any engagement stored in the engagement repository 252 may reference the messages, accounts, and/or stream involved in the engagement, for example via pointers to the message 212, account 242 and/or stream 232 repositories.

Engagements may also be categorized beyond their type. Example categories include engagements expressing a positive sentiment about a message (positive engagements), engagements expressing a negative sentiment about a message (negative engagements), engagements that allow an advertiser account to receive monetary compensation (monetizable engagements), engagements that are expected to result in additional future engagements (performance engagements), or connection engagements that are likely to result in one account holder following another account, etc. For example, the negative engagements category includes engagements such as dismissing a message or reporting a message as offensive while the positive engagements category typically includes engagements not in the negative engagements category. Example performance engagements include selecting a URL in a message or expanding a card. Example monetizable engagements include an engagement that results in an eventual purchase or a software application install to the client 110. Generally, categories and types are not coextensive, and a given type of engagement may fall into more than one category, and vice versa.

IV. Common Application Component

As shown in FIG. 1, in various embodiments, application 114 enables an account holder of the messaging system 100 to access content (e.g., text, images, software constructs, etc.). More specifically, a content item is an instance of one or more pieces of content associated with an application 114. A content item may, for example, be a software construct generated according to application computer program instructions (code). Content items may also be downloaded to a client device 110 via network 120 (e.g. a news story comprising text and images downloaded from the internet).

Applications 114 may include a common application component 116 that sends information to the messaging system 100 when a content item is accessed. Information sent by the common application component 116 may relate to the content item itself, the application 114 used to access the content item, the operating system of the device, and/or the device running the application. Common application component 116 may send data directly to index module 136, or indirectly via a front end server 140. In one embodiment, software code for the common application component 116 is distributed to developers of applications as a software development kit (SDK). A developer may add the software code to the source code of an application 114 that causes the application to send data to index module 136 upon the happening of an event (e.g., accessing a content item within the application). Multiple different instances of the code may be added to the source code of an application 114 that causes the application to send data upon the occurrence of multiple different events within the application. Which events cause the application 114 to send data are at the discretion of the developer of the application 114.

The common application component 116 is capable of being integrated within multiple different applications 114 across several client devices 110, including those with different operating systems. Accordingly, common application component 116, in conjunction with index module 136 and index repository 162 may be used to collect and store information regarding content items accessed by multiple, different applications and devices. The stored information may be used to save for later access the content items accessed by a single account holder across multiple different applications and devices. It may further be provided to the account holder or to other account holders of the messaging system 100 to facilitate content item access and other functions of client devices 110.

V. Content Item Access and Index Entry Creation

Access of a content item may occur when the content item is requested and/or provided from the messaging system 100 to a client device 110. Additionally, access of a content item may also occur when an account holder interacts (or engages) with the content item, regardless of whether the content item is actually displayed on a display of the client device. Accesses may also be recorded as engagements, as introduced above. Examples of actions that can trigger a content item access include, but are not limited to, clicking a hyperlink on a web page displayed within a client device 110, receiving a touch interaction within a software application 114 running on the client device 110.

Figure 3:
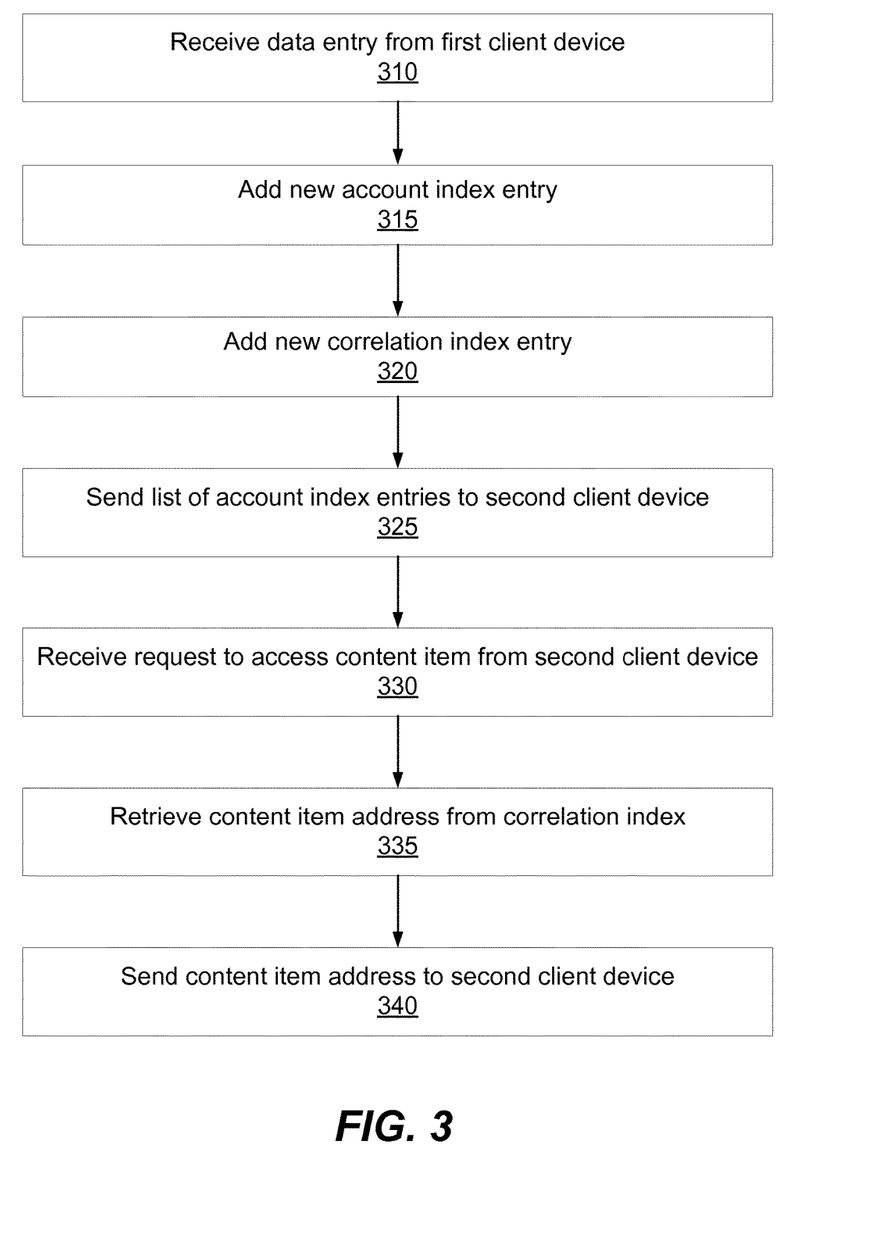
FIG. 3 is a flowchart of the steps for an example process for storing information associated with access occurrences, and providing that information to enable account holders to access content items.

FIG. 3 is a flowchart of the steps for an example process for storing information associated with access occurrences, and providing that information to enable account holders to more easily access content items. When a content item is accessed by an instance of an application 114, common application component 116 of a first client device 110 sends a data entry about the access occurrence to messaging system 100. The data entry is received 310 by the front end server 140 and subsequently relayed to index module 136. In one embodiment, the data entry comprises an application event, an application identifier (ID), a content item identifier (ID), and a content item address. In another embodiment, the data entry may further comprise the accessed content item. Data entry elements are stored in one or more indices (e.g., an account index 400, a correlation index 500, an aggregated index 600, and an aggregated account index 700) in index repository 162, as discussed with respect to FIGS. 4 and 5 below.

An application event identifies that the content item was accessed. An application event may include information associated with the access occurrence, such as when the content item was accessed, what client device 110 and operating system were used to access the content item, a geographic location where the client device 110 was located when the content item was accessed.

An application ID, as discussed above, identifies an application 114 and is independent of the operating system within which the application is executing, which means that instances of an application executing on different client devices using different operating systems have the same application ID.

A content item ID uniquely identifies a content item, at least within an application if not globally across many if not all applications associated with the common application component. Each content item accessed by application 114 may be associated with a content item ID, if the developer of the application 114 so chooses. For a particular content item, a content item ID is the same at least across different instances of the same application 114 operating on different client devices including those running different operating systems. The content item ID may also be the same across multiple applications 114 associated with the common application component.

A content item ID may be assigned to a content item in a variety of ways. For example, a content item ID may be included with a content item when it is sent from a server of an application 114 to the various instances of application 114. A content item ID may also be assigned by the messaging system 100.

A content item address (also commonly referred to as a "deep link"), specifies where the content item can be directly accessed within any instance of an application 114 operating on a client device 110 that uses a particular operating system. The content item address is specific to an instance of a content item within a particular application 114 running on a particular operating system. As a result, the content item address can directly access the content item within the corresponding application 114 and operating system combination, but cannot directly access the content item within another application 114 on a same operating system or within a same software application on another operating system. Each content item may be associated with one or more content item addresses. For some types of applications 114 such as web browsers, a content item address is a Uniform Resource Locator (URL). For other types of applications 114 such as applications that operate on mobile computing devices (e.g., smart phones running the ANROID™ or IOS™ operating systems), the content item address is a logical address that is not a URL.

Figure 4:
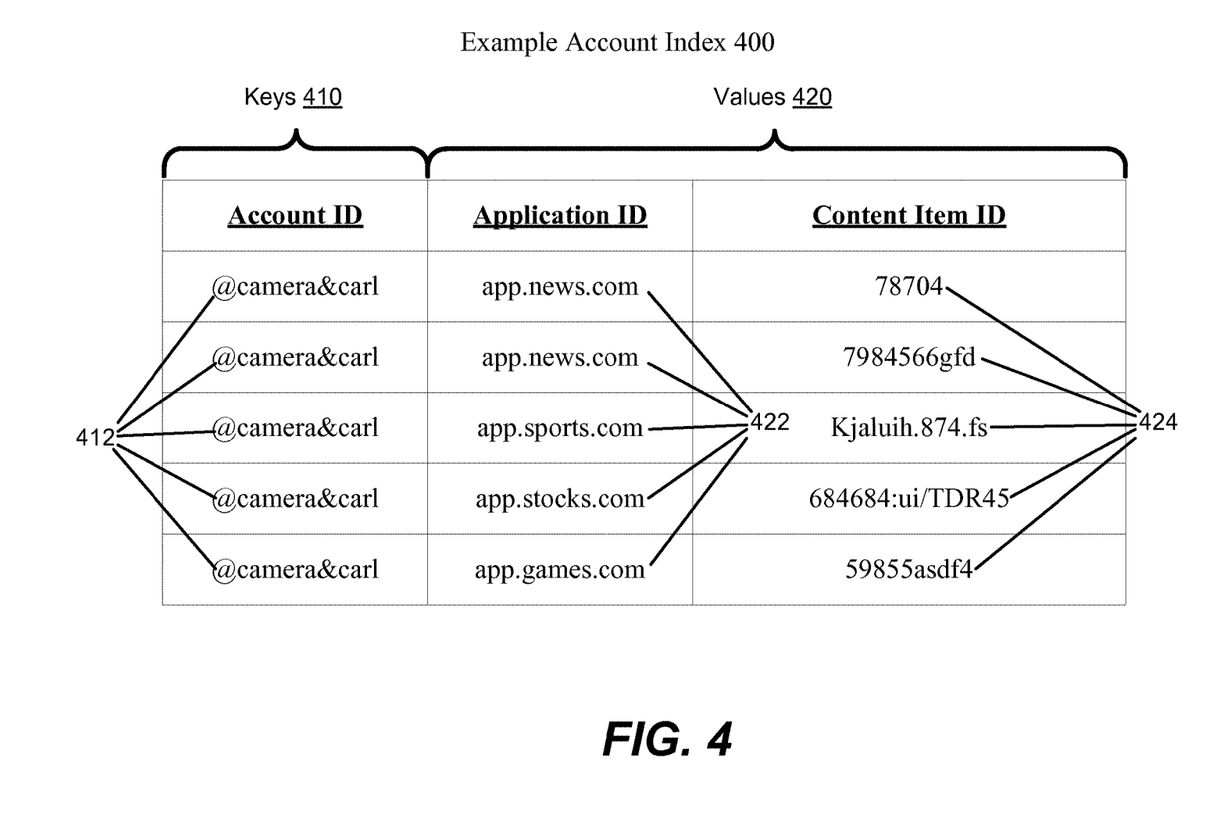
FIG. 4 illustrates example account index entries, which associate the content items accessed by each account holder, according to one embodiment.

Upon receipt of the data entry from the client device regarding the content item access, the index module 136 adds 315 a new account index entry to an account index 400. The account index 400 keeps a log of content item accesses by an account holder of the messaging system 100 for their later use. The new account index entry includes the application ID and content item ID from the data entry. The account ID associated with the data entry may be received by index module 136 as part of the data entry, or it may be retrieved from messaging database 160, for example, if the account holder has logged into their account with the messaging system 100 from the client device 110 from which the data entry was received. In one embodiment, the new account index entry also includes an operating system identifier (OS ID) corresponding to the operating system associated with the access occurrence.

FIG. 4 illustrates example account index entries, which lists the content items accessed by each account holder, according to one embodiment. For example, as shown in FIG. 4, keys 410 of the account index may include account ID entries 412 (e.g., '@camera&carl'), with corresponding values 420 including the application ID entries 422 (e.g., 'app.news.com') and content item ID entries 424 (e.g., '78704') associated with a particular content item. As a result, index module 136 can provide the content items accessed by a particular account holder back to the account holder upon request.

Figure 5:
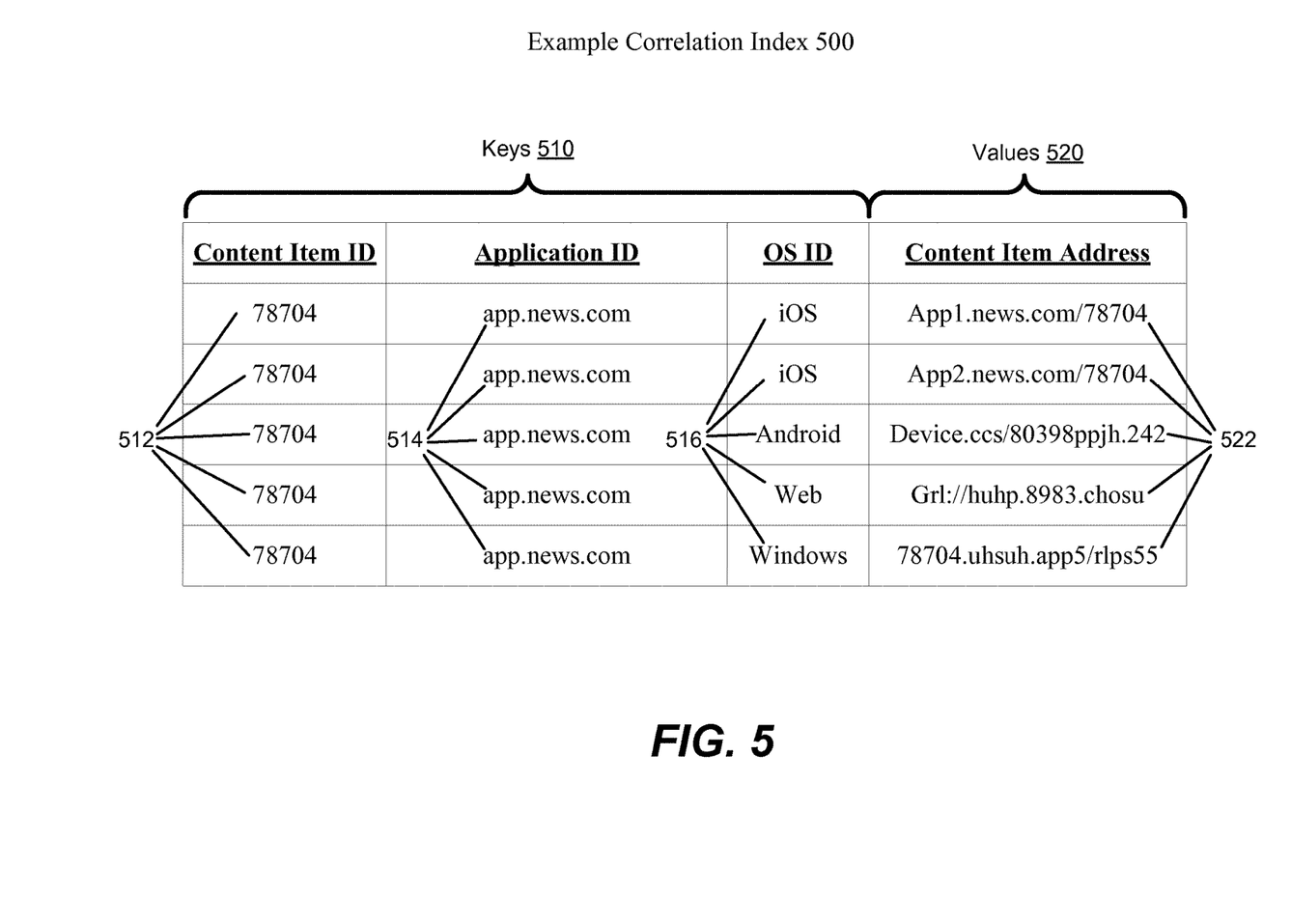
FIG. 5 illustrates example correlation index entries, which associate content items with content item addresses corresponding to various operating systems, according to one embodiment.

Returning again to FIG. 3, index module 136 also adds 320 a new correlation index entry to a correlation index 500. The correlation index 500 correlates content item addresses by content item ID across multiple account holders, to provide a central repository of the variety of content item addresses (e.g., deep links) available to be used to access that content item ID. Thus, if an account holder has accessed a first content item ID on a first device/operating system combination but not a second device/operating system combination, as long as some other account holder of the messaging system has accessed that content item ID with the second device/operating system combination, the correlation index will have stored the content item address for that combination, thus allowing the account holder to use a device having the second device/operating system combination to access that content item ID quickly, for example through use of a log of content item ID accesses such as may be provided by the access index 400.

The correlation index 500 includes the content item ID, the OS ID, and the content item address from the received data entry. The correlation index may also include the application ID. Entries in the correlation index associated with a particular content item may be received at different times from different client devices 110, and from client devices associated with different account holders. FIG. 5 illustrates example correlation index entries, which associate content items with content item addresses corresponding to various operating systems, according to one embodiment. For example, as shown in FIG. 5, keys 510 of the correlation index may include content item ID entries 512 (e.g., '78704'), application ID entries 514 (e.g., 'app.news.com'), and OS ID entries 516 (e.g., 'iOS'). Values 520 may include content item address entries 522 (e.g., 'Appl.news.com/78704'). Particular content item ID entries and application ID entries may appear in both account index 400 and correlation index 500. Each combination of a content item ID and an application ID (e.g., '78704.app.news.com') corresponds to an instance of a content item within a particular application, but does not vary across operating systems or client devices. Thus, to retrieve a content item address corresponding to an application executing in conjunction with a particular operating system, the index module 136 uses the OS ID. From the correlation index 500, index module 136 can determine various content item addresses associated with different operating systems for a single content item ID.

The actual media content of a received content item may be indexed and stored in correlation index 500 to enable text or other content-based searching. For example, if a content item includes text, the text may be stored in correlation index 500. The text may be stored such that index module 136 may receive a text query from a device of an account holder and return to the device a list of content items that match the query. The list may be sorted based on a relevance score, which is discussed in more detail below. An account holder may view and interact with the list of matching content items to access the content items, as discussed in more detail below.

VI. Index Use

An account holder may use software 112 or an application 114 to view a list of content items (e.g., previously-accessed content items, content items matching a search query, etc.). In the example process of FIG. 3, upon receipt of a request from a client device 110 associated with the account holder, the index module 136 sends 325 a list of account index entries corresponding to the account ID of the account holder to a client device 110. To illustrate the use of the correlation index 500, the client device 110 that the index module 136 sends the account index entries to is referred to as the second client device 110, running a second operating system. This is distinguished from a first client device 110, running a first operating system different than the second operating system.

The list of content items sent by the index module 136 to the second client device 110 may be interactive, allowing an account holder to access the content items listed in the entries by interacting with the list (e.g. tapping, clicking, etc.) on their client device. Interacting with a list item may cause the client device 110 to navigate to a content item address, which may include executing applications 114 on the device and navigating to particular content item addresses within those applications so that the content item is presented by the client device within the associated application 114.

The index module 136 receives 330 a request to access a content item from the second client device 110. For example, the request may specify the content item ID of the content item to be accessed. The content item specified by the request may have been previously accessed by the account holder on the second client device 110, or it may have been previously accessed by the account holder on another client device such as the first client device. In either of these instances, the request may be a result of the account holder interacting with the previously provided account index entries. Alternatively, the content item access request may be retrieved from another source, such as from a recommendation provided by the messaging system 100, as described further below. The request received from the second computing device includes the content item ID, and may also include an application ID and an OS ID of the second operating system.

The index module 136 uses the data from the request to retrieve 335, from the correlation index 500, a content item address for the requested content item ID and the operating system ID. Index module 136 sends 340 the retrieved content item address to the second client device 110, which allows the second client device to access the content item. The index module 136 may also send 340 an application ID to specify the application 114 to be used to access the content item.

Because the correlation index 500 is not account-specific, the retrieved content item address may have been added to the correlation index responsive to the content item being accessed by an account holder different from the account holder making use of the first and second computing devices. Accordingly, an account holder has access to content item addresses beyond just those they have already visited, for example as logged by the account index 400. This allows an account holder to easily access a content item across multiple applications and devices/operating systems, regardless of how the account holder previously accessed the content item (e.g., on the first computing device but not the second computing device) or even if the account holder has not previously accessed the content item at all.

VII. Content Recommendations

Index module 136 may provide one or more recommendations of content items an account holder may be interested in accessing. Recommendation may be provided, for example, in response to a request for a list of accessed content items, in response to a text query, upon interaction with a list item, or by request from another part of the messaging system. Example recommendations include recommendations for related content items that have not been accessed, recommendations for applications 114 associated with accessed content items, recommendations for popular content items, recommendations for popular applications, etc. For example, if a content item accessed by a client device 110 is associated with an application 114 that has not been installed on the client device, index module 136 may include a link (e.g. URL or other logical address) to a location where the application can be downloaded to the client device.

Recommendations may be based on a relevance score determined by index module 136 for a particular content item or application. Factors in a relevance score may include a number of times a content item has been accessed (e.g., by a particular account holder, by a subset of all account holders, by all account holders, etc.). Factors may additionally include how recently a content item was accessed, how recently a content item was generated, and how much time has elapsed between accesses. Factors in a relevance score may further include measures of application use (e.g., by a particular account holder, by a subset of all account holders, by all account holders, etc.), sponsor agreements with application or content item owners, etc. Data associated with relevance score factors is stored in index repository 162. As an example, a recommendation for a particular application 114 may be provided responsive to an account holder accessing a particular content item on a different application from the one that is most commonly used to access that content item. For example, a recommendation may be provided to the accessing client device if a determined relevance score is above a threshold designated by a developer and if the corresponding application 114 that is most commonly used to access the requested content item has not been installed on the requesting client device 110.

Figure 6:
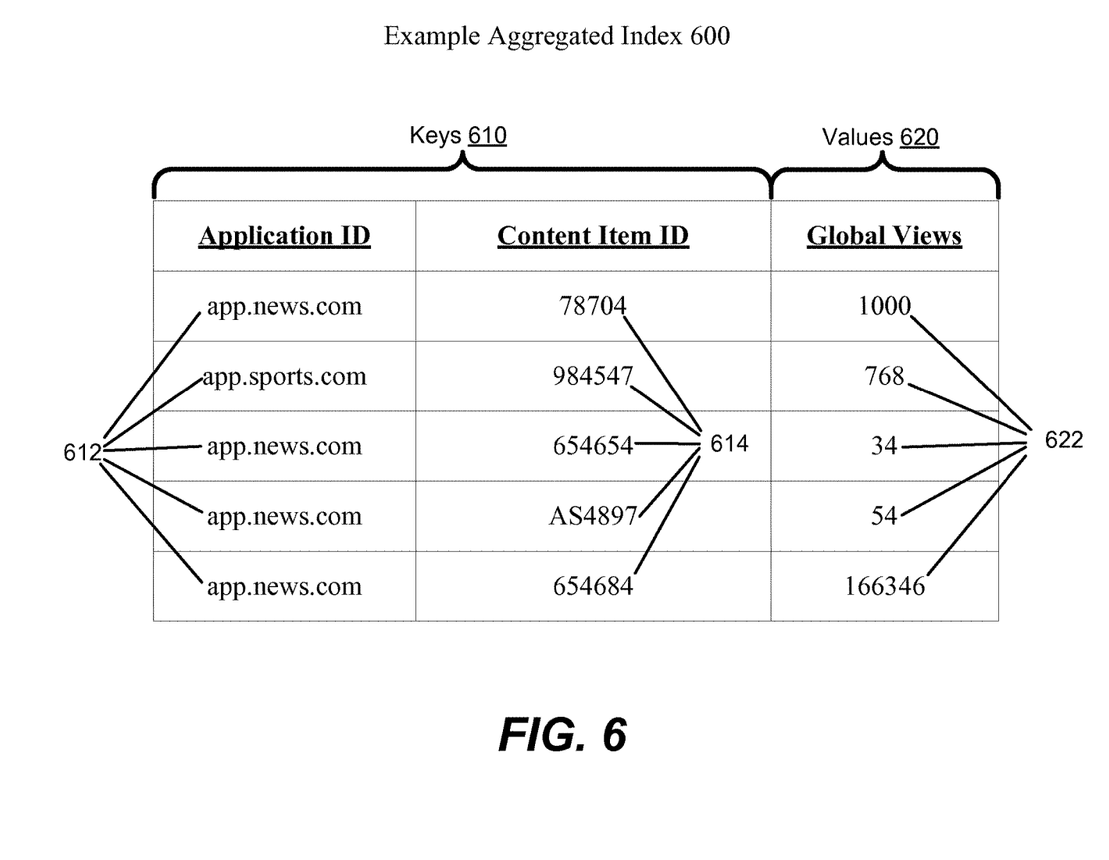
FIG. 6 illustrates example aggregated index entries corresponding to aggregated content item views and application use, according to one embodiment.

FIG. 6 illustrates example index entries of an aggregated index 600 that aggregates content item views across multiple account holders for use in providing recommendations, according to one embodiment. Keys 610 include application ID entries 612 and content item ID entries 614. Values 620 include global view entries 622. Global view totals may be determined by index module 136, for example by counting data entries received by index module 136 or by counting index entries in the account index or correlation index. Index module 136 may determine application use information based on the views associated with a particular application ID across multiple content item IDs. The aggregated statistics regarding content item IDs collected in the aggregated index 600 are used by the messaging servers 130 to determine which content item IDs to recommend.

Figure 7:
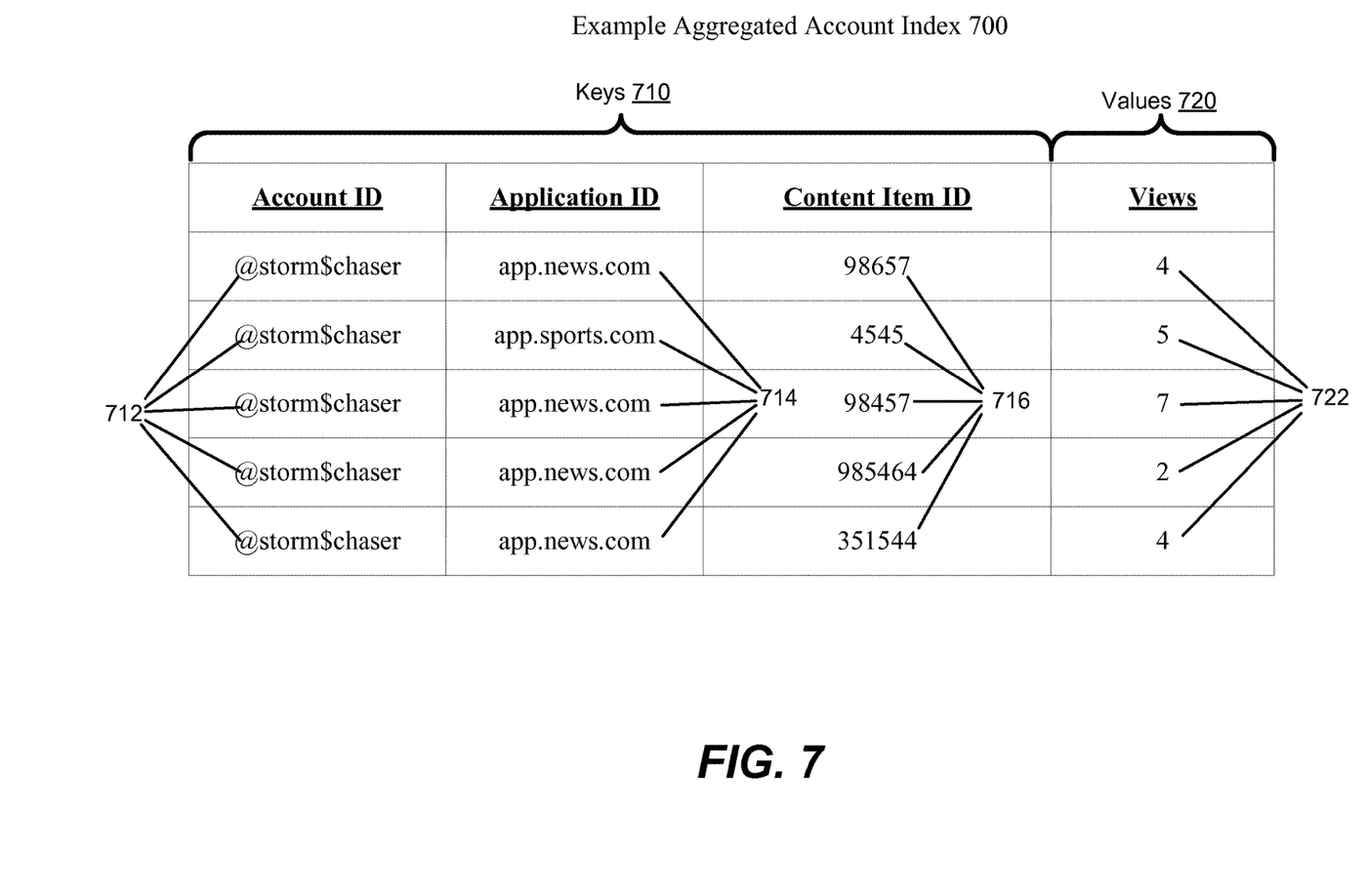
FIG. 7 illustrates example aggregated account index entries corresponding to account-holder-specific content item views and application use, according to one embodiment.

FIG. 7 illustrates example index entries of an aggregated account index 700 that aggregates content item views and application use on an account-holder-specific basis, according to one embodiment. Keys 710 include account ID entries 712, application ID entries 714, and content item ID entries 716. Values 720 include account holder view entries 722. Account holder view totals may be determined by index module 136 or by counting index entries in the account index. Index module 136 may determine application use information based on the views associated with a particular application ID across multiple content item IDs. The aggregated statistics regarding content item IDs collected in the indices 600 and 700 are used by the messaging servers 130 to determine which content item IDs to recommend to the particular account holder associated with each index 700.

VIII. Additional Considerations

It is noted that wherever practicable similar or like reference numbers are used in the figures and may indicate similar or like functionality. The figures depict embodiments of the disclosed system (or method) for purposes of illustration only. One skilled in the art will readily recognize from the description herein that alternative embodiments of the structures and methods illustrated herein may be employed without departing from the principles described herein.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

It will be understood that the named components represent one embodiment, and other embodiments may include other components. In addition, other embodiments may lack the components described herein and/or distribute the described functionality among the components in a different manner. Additionally, the functionalities attributed to more than one component can be incorporated into a single component.

As noted above, the computing devices described in FIGS. 1 and 2 include a number of "modules," which refers to computational logic for providing the specified functionality. A module is implemented in software that operates on at least one computing device. Each module can be implemented as a standalone software program, but can also be implemented through other means, for example as part of a larger program, as a plurality of separate programs, or as one or more statically or dynamically linked libraries. In any of these software implementations, the modules are stored on the computer readable persistent storage devices of the computing device(s) within which they are located, loaded into memory, and executed by one or more processors (generally, "a processor") of the computing device. The various data processing operations described herein are sufficiently complex and time consuming as to require the operation of a computing device, and cannot be performed merely by mental steps.

Embodiments described may also relate to an apparatus for performing the operations herein. This apparatus is specially constructed for the purpose described herein, owing to the large number of accounts, messages, streams, and related content (e.g., engagements) that are processed by the messaging system 100 generally, and which are processed by the messaging server 130 specifically. The tasks carried out by the messaging server 130 may be persistently stored in a non-transitory, tangible computer readable storage medium, or any type of media suitable for storing electronic instructions, which may be coupled to a computer system bus within the messaging server 130. Furthermore, any of the computing devices referred to in the specification may include a single processor or may be architectures employing multiple processor designs for increased computing capability. Embodiments of the invention may also relate to a product that is produced by a process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments described is intended to be illustrative, but not limiting, of the scope of what is protectable, which is set forth in the following claims.

What is claimed is:

1. A method comprising:
receiving, from a common application component making up part of an instance of a software application executing in conjunction with a first operating system on a first mobile computing device, a data entry comprising:
a content item identifier (ID) identifying a content item,
a mobile application ID identifying the software application,
a content item address specifying where the content item can be directly accessed within any instance of the software application operating on another mobile computing device that also uses the first operating system;
adding, to a correlation index, a new correlation index entry comprising the content item ID, the mobile application ID , the content item address, and an identifier of the first operating system receiving, from a second mobile computing device, a request to access the content item associated with the content item ID and the mobile application ID;

retrieving, from the correlation index, a second content item address; and sending the second content item address to the second mobile computing device.

2. The method of claim 1, wherein:

the first and second mobile computing devices are different from each other;

the second mobile computing device is running a second operating system; and the second operating system is different from the first operating system.

3. The method of claim 1, wherein the data entry further comprises:

an account ID identifying a user of the first mobile computing device; and an application event identifying that the user accessed a content item made available within the instance of the software application.

4. The method of claim 3, wherein:

the correlation index further comprises another correlation index entry comprising the content ID, the mobile application ID, a second content item address, and an identifier of a second operating system; and the second mobile computing device is associated with the account ID and running the second operating system.

5. The method of claim 4, further comprising:

adding, to an account index associated with the account ID, a new account index entry comprising the application event, the content item ID, and the mobile application ID.

sending, to the second mobile computing device, a list of entries from the account index including the new account index entry.

6. The method of claim 5, further comprising:

determining a relevance score corresponding to a number of application events corresponding to the content item in the account index; and if the relevance score is above a threshold, sending, to the first mobile computing device, a recommendation comprising the content item address.

7. The method of claim 1, wherein the second content item address was received from a third mobile computing device running the second operating system.

8. The method of claim 1, wherein the content item address is not a URL.

9. The method of claim 1, wherein the content item address is specific to the software application and operating system, such that the content item address can directly access the content item within the corresponding software application and operating system combination, but cannot directly access the content item within another software application on a same operating system or within a same software application on another operating system.

10. The method of claim 1, wherein the content item comprises at least one from the group consisting of text, images, and a software construct.

11. The method of claim 1, further comprising:

sending, to the first mobile computing device, a recommendation comprising a download link for a second software application associated with the content item.

12. The method of claim 1, further comprising:

responsive to receiving the request to access the content item, sending, to the second mobile computing device, a recommendation comprising a download link for a second software application associated with the content item.

13. A method comprising:

sending, from a first mobile computing device, a request to access a content item within a first instance of a software application executing in conjunction with a first operating system on the first mobile computing device, the request comprising:

a content item identifier (ID) identifying the content item;

a mobile application ID identifying the software application;

an account ID identifying a user of the first mobile computing device, the account ID associated with an account index entry comprising an application event identifying that the user accessed the content item made available within a second instance of the software application running on a second mobile computing device;

receiving, from a server, a content item address specifying where the content item can be directly accessed within any instance of the software application operating on a mobile computing device that also uses the first operating system, the content item address stored in a correlation index entry of a correlation index responsive to a user associated with a different account ID accessing the content item made available within a third instance of the software application executing in conjunction with the first operating system on a third mobile computing device;

accessing the content item made available within the first instance of the software application running on the first mobile computing device.

14. The method of claim 13, wherein the first and second operating systems are different from each other and wherein the first and second mobile computing devices are different from each other.

15. The method of claim 13, wherein the logical address is not a URL.

16. The method of claim 13, wherein the content item address is a specific to the software application and operating system, such that the content item address can directly access the content item within the corresponding software application and operating system combination, but cannot directly access the content item within another software application on a same operating system or within a same software application on another operating system.

17. The method of claim 13, wherein the content item comprises at least one from the group consisting of text, images, and a software construct.

18. The method of claim 13, further comprising:

determining a relevance score, the relevance score corresponding to a number of times the content item has been accessed by a plurality of users of a messaging system, how recently the content item was generated or accessed, or an amount of time between accesses; and if the relevance score is above a threshold, sending, to a fourth mobile computing device, a recommendation comprising the content item address.

19. The method of claim 13, further comprising:

sending, to the first mobile computing device, a recommendation comprising a download link for a second software application associated with the content item.

20. The method of claim 13, further comprising:

responsive to sending the request to access the content item, receiving, from the server, a recommendation comprising a download link for a second software application associated with the content item.

21. A non-transitory computer readable storage medium storing instructions, the instructions when executed by a processor causes the processor to:
receive, from a common application component making up part of an instance of a software application executing in conjunction with a first operating system on a first mobile computing device, a data entry comprising:
a content item identifier (ID) identifying a content item,
a mobile application ID identifying the software application,
a content item address specifying where the content item can be directly accessed within any instance of the software application operating on another mobile computing device that also uses the first operating system;
add, to a correlation index, a new correlation index entry comprising the content item ID, the mobile application ID, the content item address, and an identifier of the first operating system
receive, from a second mobile computing device, a request to access the content item associated with the content item ID and the mobile application ID;
retrieve, from the correlation index, a second content item address; and
send the second content item address to the second mobile computing device.

22. The non-transitory computer readable storage medium of claim 21, wherein the first and second mobile computing devices are different from each other;
the second mobile computing device is running a second operating system; and
the second operating system is different from the first operating system.

23. The non-transitory computer readable storage medium of claim 21, wherein the data entry further comprises:
an account ID identifying a user of the first mobile computing device; and
an application event identifying that the user accessed a content item made available within the instance of the software application.

24. A system comprising:
a processor; and
a non-transitory computer readable storage medium configured to store instructions, the instructions executable by the processor and that when executed cause the processor to:
receive, from a common application component making up part of an instance of a software application executing in conjunction with a first operating system on a first mobile computing device, a data entry comprising:
a content item identifier (ID) identifying a content item,
a mobile application ID identifying the software application,
a content item address specifying where the content item can be directly accessed within any instance of the software application operating on another mobile computing device that also uses the first operating system;
add, to a correlation index, a new correlation index entry comprising the content item ID, the mobile application ID, the content item address, and an identifier of the first operating system receive, from a second mobile computing device, a request to access the content item associated with the content item ID and the mobile application ID;
retrieve, from the correlation index, a second content item address; and
send the second content item address to the second mobile computing device.

25. The system of claim 24, wherein
the first and second mobile computing devices are different from each other;
the second mobile computing device is running a second operating system; and
the second operating system is different from the first operating system.

26. The system of claim 24, wherein the data entry further comprises:
an account ID identifying a user of the first mobile computing device; and
an application event identifying that the user accessed a content item made available within the instance of the software application.

27. A non-transitory computer readable storage medium storing instructions, the instructions when executed by a processor causes the processor to:
send, from a first mobile computing device, a request to access a content item within a first instance of a software application executing in conjunction with a first operating system on the first mobile computing device, the request comprising:
a content item identifier (ID) identifying the content item;
a mobile application ID identifying the software application;
an account ID identifying a user of the first mobile computing device, the account ID associated with an account index entry comprising an application event identifying that the user accessed the content item made available within a second instance of the software application running on a second mobile computing device;
receive, from a server, a content item address specifying where the content item can be directly accessed within any instance of the software application operating on a mobile computing device that also uses the first operating system, the content item address stored in a correlation index entry of a correlation index responsive to a user associated with a different account ID accessing the content item made available within a third instance of the software application executing in conjunction with the first operating system on a third mobile computing device;
access the content item made available within the first instance of the software application running on the first mobile computing device.

28. The non-transitory computer readable storage medium of claim 27, wherein the first and second operating systems are different from each other and wherein the first and second mobile computing devices are different from each other.

29. A system comprising:
a processor; and
a non-transitory computer readable storage medium configured to store instructions, the instructions executable by the processor and that when executed cause the processor to:
send, from a first mobile computing device, a request to access a content item within a first instance of a software application executing in conjunction with a first operating system on the first mobile computing device, the request comprising:
    a content item identifier (ID) identifying the content item;
    a mobile application ID identifying the software application;
an account ID identifying a user of the first mobile computing device, the account ID associated with an account index entry comprising an application event identifying that the user accessed the content item made available within a second instance of the software application running on a second mobile computing device;
receive, from a server, a content item address specifying where the content item can be directly accessed within any instance of the software application operating on a mobile computing device that also uses the first operating system, the content item address stored in a correlation index entry of a correlation index responsive to a user associated with a different account ID accessing the content item made available within a third instance of the software application executing in conjunction with the first operating system on a third mobile computing device;
access the content item made available within the first instance of the software application running on the first mobile computing device.

30. The system of claim 24, wherein the first and second operating systems are different from each other and wherein the first and second mobile computing devices are different from each other.

* * * * *